United States Patent [19]
Nakazawa et al.

[11] 3,867,146
[45] Feb. 18, 1975

[54] HOLOGRAPHIC REPRODUCTION USING CARBOCYANINE DYE SENSITIZED, FINE-GRAIN SILVER HALIDE EMULSIONS AND NEON-HELIUM LASERS

[75] Inventors: Yoshiyuki Nakazawa; Yasuharu Nakamura; Tohru Sueyoshi; Shigenori Moriuchi; Akira Sato; Tadashi Ikeda, all of Ashigara-Kamigun, Kanagawa, Japan

[73] Assignee: Fuji Photo Film Co., Ltd., Kanagawa, Japan

[22] Filed: Dec. 14, 1971

[21] Appl. No.: 207,857

[30] Foreign Application Priority Data
Dec. 14, 1970  Japan.............................. 45-111585

[52] U.S. Cl.................................. 96/27 H, 96/137
[51] Int. Cl............................................. G03c 5/04
[58] Field of Search............................ 96/137, 27 H

[56] References Cited
UNITED STATES PATENTS

| | | | |
|---|---|---|---|
| 3,776,727 | 12/1973 | Nassenstein et al. | 96/27 H |
| 3,501,305 | 3/1970 | Illingsworth | 96/107 |
| 3,501,306 | 3/1970 | Illingsworth | 96/107 |
| 3,632,348 | 1/1972 | James | 96/130 |
| 3,706,566 | 12/1972 | Shiba et al. | 96/94 |
| 3,706,570 | 12/1972 | Nakazawa et al. | 96/137 |

Primary Examiner—J. Travis Brown
Attorney, Agent, or Firm—Sughrue, Rothwell, Mion, Zinn & Macpeak

[57] ABSTRACT

A silver halide photographic emulsion comprising extremely finegrain silver halide particles and one or more sensitizing dyes of the general formula:

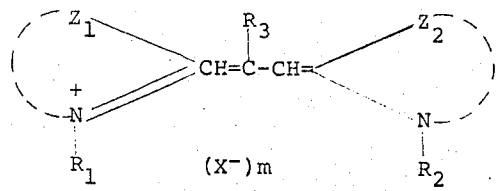

in which $Z_1$ and $Z_2$ represent atoms necessary for completing a benzothiazole nucleus, a benzoselenazole nucleus, a naphthothiazole nucleus or a naphthoselenazole nucleus; $R_1$ and $R_2$ represent lower alkyl or substituted alkyl; $R_3$ represents lower alkyl, aryl or substituted aryl; X represents an anion; and m represents an integer of 0 or 1. By using this emulsion, clear holograms can be obtained.

6 Claims, 3 Drawing Figures mμ mμ mμ ns used for holographic recording and reproducing to find sensitizing dyes having an excellent spectral sensitizing action on extremely fine-grain silver halide photographic emulsions.

HOLOGRAPHIC REPRODUCTION USING CARBOCYANINE DYE SENSITIZED, FINE-GRAIN SILVER HALIDE EMULSIONS AND NEON-HELIUM LASERS

BACKGROUND OF THE INVENTION

Field of the Invention

This invention relates to a photographic material especially adapted for use in the technique of holography which records and reproduces objects using coherent light generated from a laser. More particularly, it relates to a fine-grain silver halide photographic emulsion spectrally sensitized by certain sensitizing dyes having a high spectral sensitivity of the red sensitivity region of 620–660 m$\mu$.

Description of the Prior Art

Sensitive material used in holographic reproduction are required to have a good sensitivity to the laser beam used. In other words, they must have a high spectral sensitivity at the wavelength of the laser beam used.

A laser beam has an inherent wavelength which is determined by the kind of laser, more concretely the kind of material which is used as the medium for laser oscillation, and laser light has an extremely high monochromatic property.

Lasers now widely used utilize rubies, neon and helium gas, argon gas, krypton gas, carbon dioxide gas, and the like as the media for laser oscillation. The laser which is at present the most low-priced and provides the stablest output utilizes neon and helium gas as the medium for laser oscillation, and is called a neon-helium laser. It is now most general to use a neon-helium laser for holography. The wavelength of neon-helium laser light is in most cases established at 632.8 m$\mu$.

A silver halide photographic sensitive material suited for holographic recording using a neon-helium laser is required to have a high spectral sensitivity at the wavelength region of neon-helium laser light, 632.8 m$\mu$. In addition, the silver halide photographic sensitive material is required to have high resolution since the spatial frequency of the hologram image to be recorded and reproduced in holography exceeds 1,000 lines/mm. Therefore, it is necessary that light scattering in the photographic emulsion layer be slight. Further, the image must have extremely fine granularity.

In order to meet these conditions, it is necessary to use photographic emulsions having extremely fine-grain silver halide particles, more specifically, silver halide particles having an average particle diameter of not more than 0.1 micron.

However, it cannot always be concluded that a sensitizing dye which is known to have an excellent spectral sensitizing action on a silver halide emulsion of relatively large particle diameter will also have an excellent spectral sensitizing action on silver halide emulsions of small particle size.

For example, although the sensitizing dye groups described in Japanese Patent Application No. 13,284/70 are known as excellent sensitizing dyes having high red sensitivity, the addition of these dyes to the fine-grain silver halide photographic emulsion used in the present invention causes disappearance of the J-band sensitization due to aggregation of the sensitizing dyes, and moreover decreases the red sensitivity.

Accordingly, it is an important object in the production of high resolution photographic sensitive emulsions used for holographic recording and reproducing to find sensitizing dyes having an excellent spectral sensitizing action on extremely fine-grain silver halide photographic emulsions.

SUMMARY OF THE INVENTION

In the present invention, we have found that a fine-grain silver halide photographic emulsion having a high spectral sensitivity to monochromatic light of a wavelength of 632.8 m$\mu$ generated by a neon-helium laser can be obtained by spectrally sensitizing a fine-grain silver halide emulsion in which the average silver halide particle diameter does not exceed 0.18 micron or in which at least 95 percent of the total silver halide particles have a particle diameter of not more than 0.2 micron, using certain sensitizing dyes.

One object of the present invention is thus to provide a fine-grain silver halide photographic emulsion which is highly spectrally sensitive to monochromatic light of 632.8 m$\mu$ generated by a neon-helium laser, more generally which is highly spectrally sensitive to light in the wavelength region of 620–660 m$\mu$, by spectrally sensitizing the fine-grain silver halide emulsion using certain sensitizing dyes.

This object can be accomplished by adding at least one sensitizing dye represented by the following general formula to a silver halide emulsion in which the average silver halide particle diameter does not exceed 0.18 micron or in which at least 95 percent of the total silver halide particles has a particle diameter of not more than 0.2 micron:

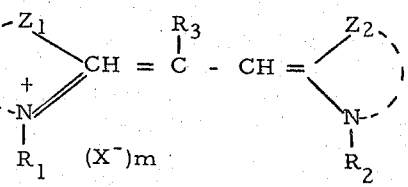

$Z_1$ and $Z_2$ represent atomic groups necessary for completing a benzothiazole nucleus, a benzoselenazole nucleus, a naphthothiazole nucleus or a naphthoselenazole nucleus, wherein the benzene rings of these heterocyclic nuclei may be substituted by substituents which do not hinder to highly spectrally sensitize the wavelength region of 620–660 m$\mu$, such as alkyl, halogen, alkoxy, hydroxy, aryl, carboxy, alkoxycarbonyl, acylamino and mixtures thereof.

The term benzothiazole nucleus includes, for example, benzothiazole, 5-methylbenzothiazole, 5-chlorobenzothiazole, 5-methoxybenzothiazole, 5-hydroxybenzothiazole, 5,6-dimethylbenzothiazole, 5-ethoxy-6-methylbenzothiazole, 5-hydroxy-6-methylbenzothiazole, 5-phenylbenzothiazole, 5-carboxybenzothiazole, 5-methoxycarbonylbenzothiazole, 5-acetylaminobenzothiazole and the like, the term benzoselenazole nucleus includes, for example, benzoselenazole, 5-methylbenzoselenazole, 5-chlorobenzoselenazole, 5-methoxybenzoselenazole, 5-hydroxybenzoselenazole, 5,6-dimethylbenzoselenazole, 5-ethoxy-6-methylbenzoselenazole, 5-hydroxy-6-methylbenzoselenazole, 5-phenylbenzoselenazole and the like, the term naphthothiazole nucleus includes, for example, β-naphthothiazole, β,β-naphthothiazole and β-naphthoselenazole and the like.

$R_1$ and $R_2$ represent a lower alkyl (e.g. methyl, ethyl, n-propyl), a substituted alkyl group conventionally employed as N-substituent of the cyanine dye (e.g. carboxy alkyl such as β-carboxyethyl, γ-carboxypropyl, δ-carboxybutyl and ω-carboxypentyl; sulfoalkyl such as γ-sulfopropyl, γ-sulfobutyl and γ-sulfobutyl; allyl such as vinylmethyl) and the like.

$R_3$ represents a lower alkyl (e.g. methyl, ethyl, n-propyl), an aryl group (e.g. phenyl, 0-carboxyphenyl, etc.). However, when $R_3$ is methyl, the benzene ring of the heterocyclic nucleus completed by $Z_1$ and/or $Z_2$ are substituted by the aforementioned substituents, such as for example alkyl groups.

$X^-$ represents an anion commonly used in the field of cyanine dyes such as for example, a halogen ion, a perchlorate ion, a thiocyanate ion, a benzenesulfonate ion, a p-toluenesulfonate ion, a methylsulfate ion, an ethylsulfate ion, etc.

$m$ represents an integer of 0 or 1, with $m$ being 0 when the dye forms an intramolecular salt (betaine-like structure).

DETAILED DESCRIPTION OF THE INVENTION

Figure 1:
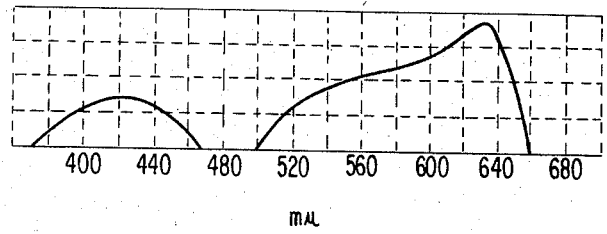

Representative examples of the sensitizing dyes used in the present invention are shown below, but of course the sensitizing dyes of the present invention are not limited thereto.

Dye 1.

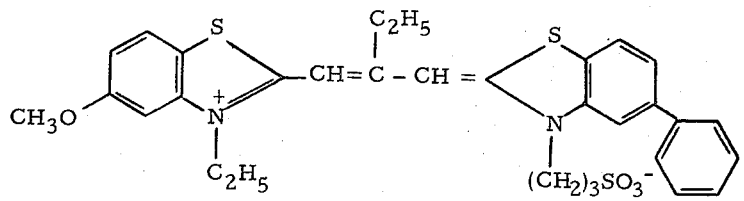

Dye 2.

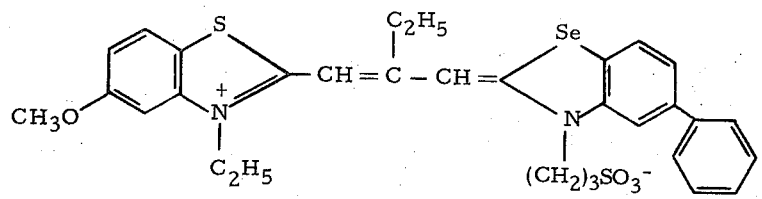

Dye 3.

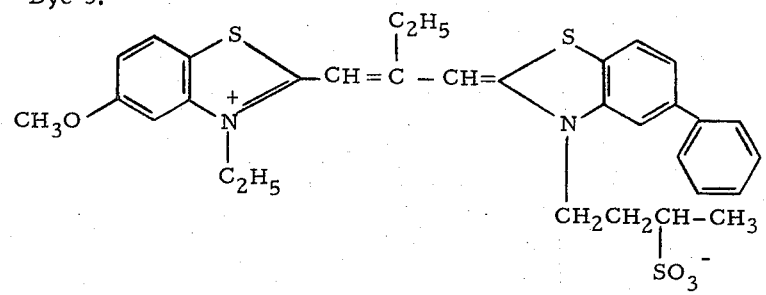

Dye 4.

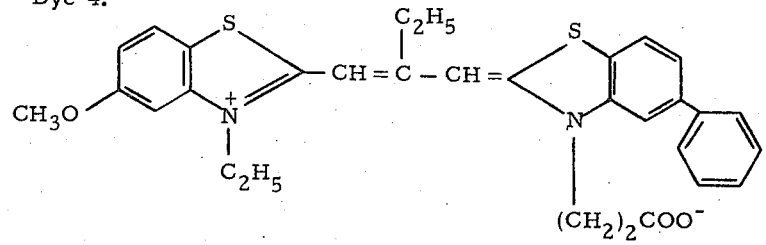

Dye 5.

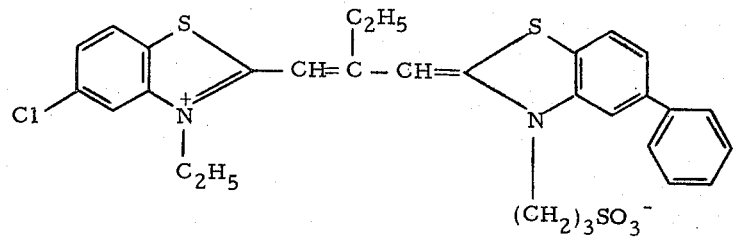

Dye 6.
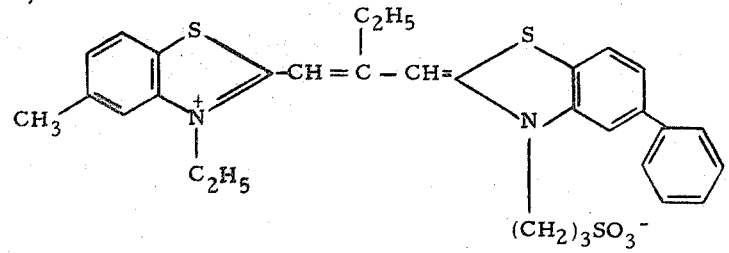
Dye 7.
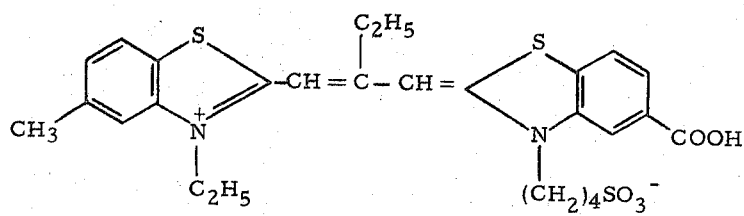
Dye 8.
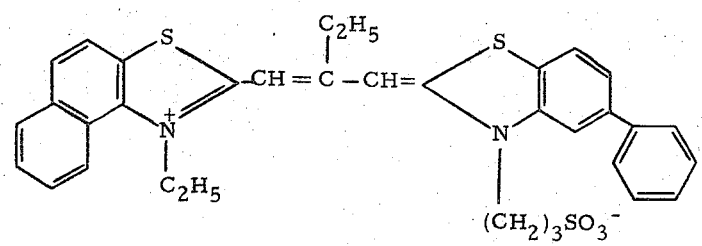
Dye 9.
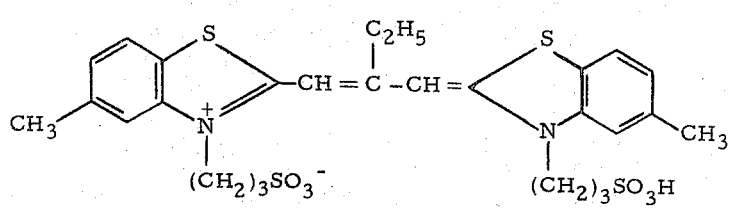
Dye 10.
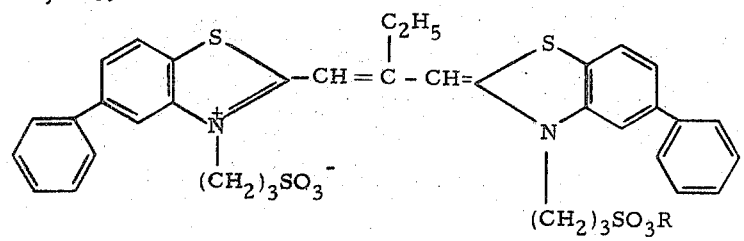
Dye 11.
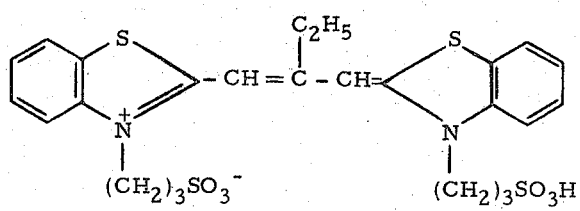
Dye 12.
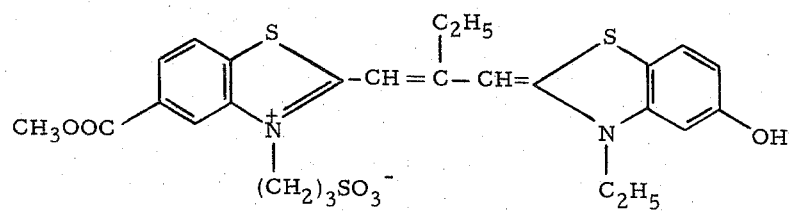

Dye 13.
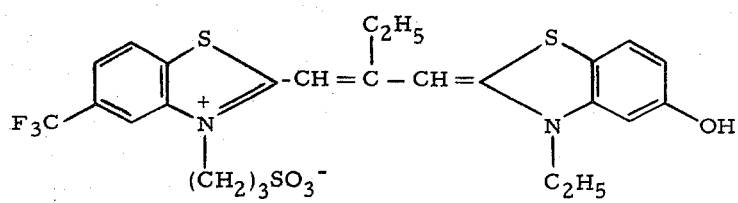
Dye 14.
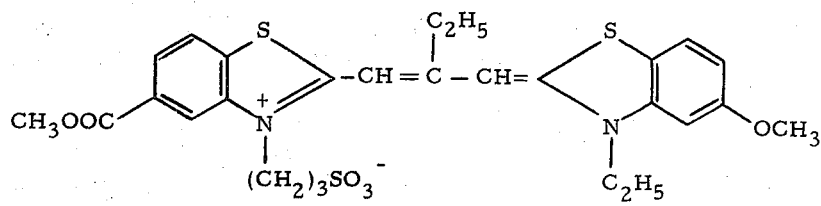
Dye 15.
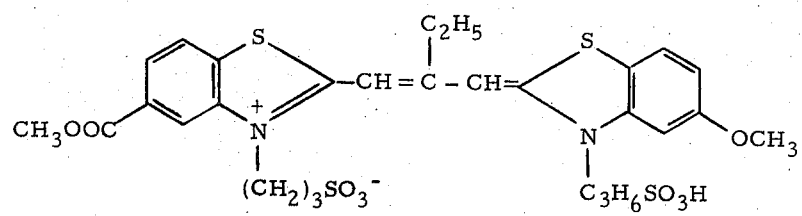
Dye 16.
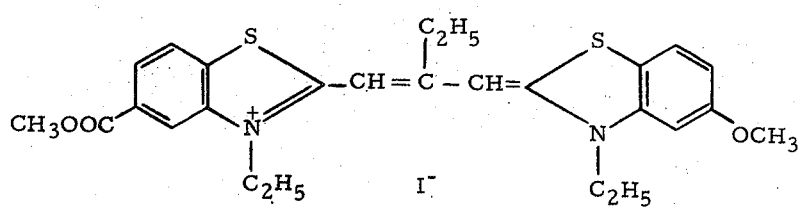
Dye 17.
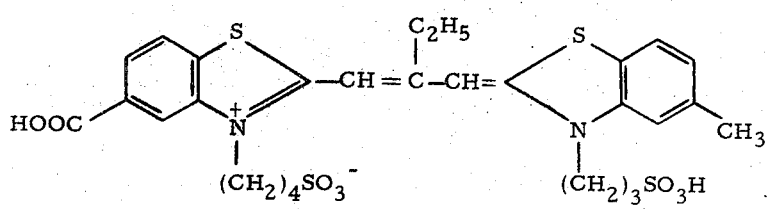
Dye 18.
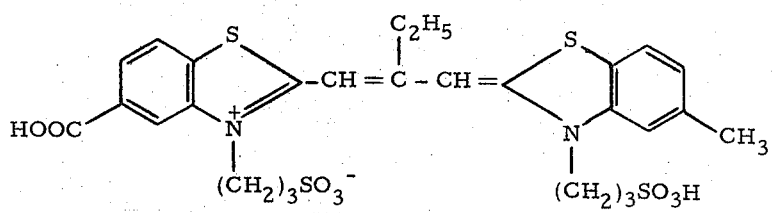
Dye 19.
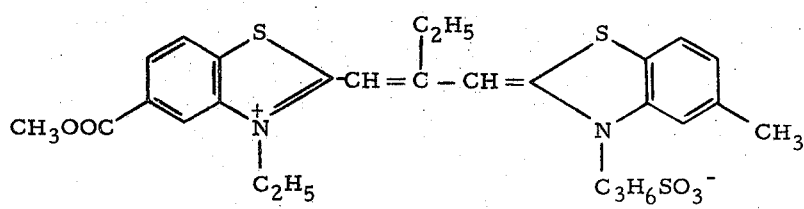

Dye 20.
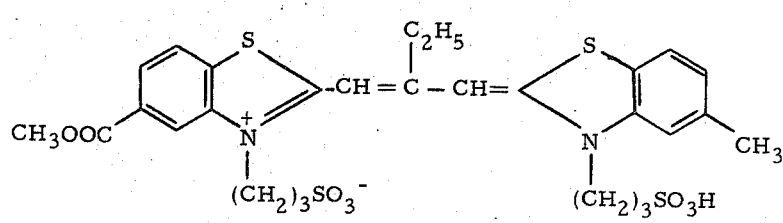
Dye 21.
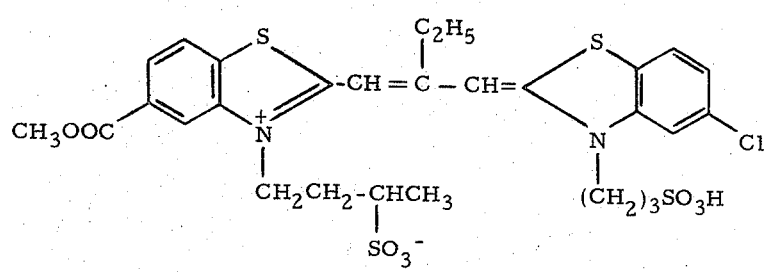
Dye 22.
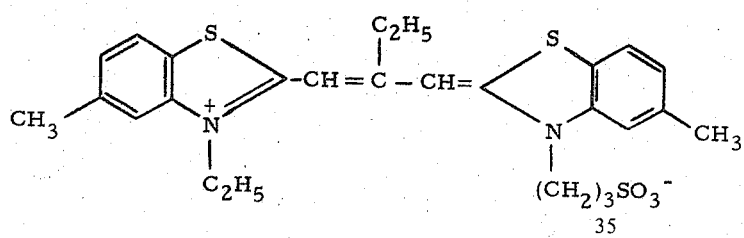
Dye 23.
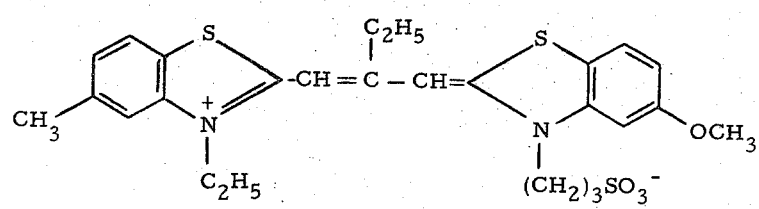
Dye 24.
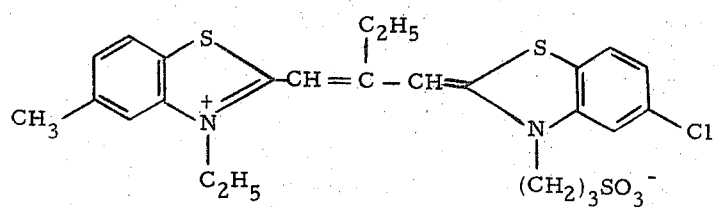
Dye 25.
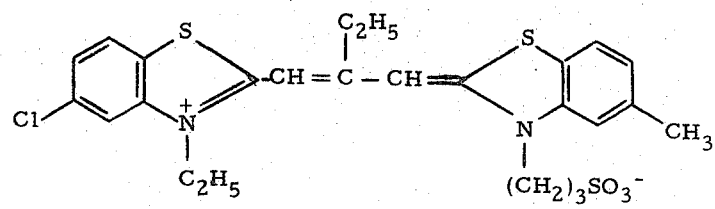

Dye 26.
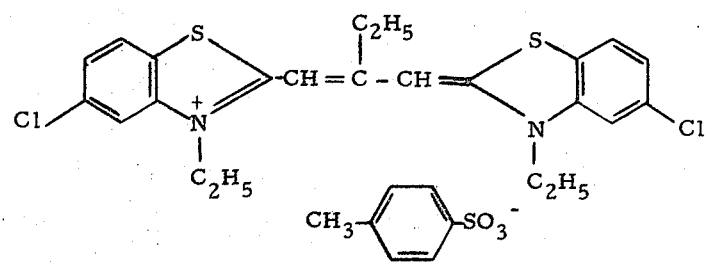
Dye 27.
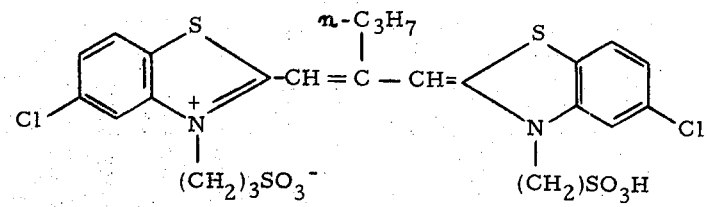
Dye 28.
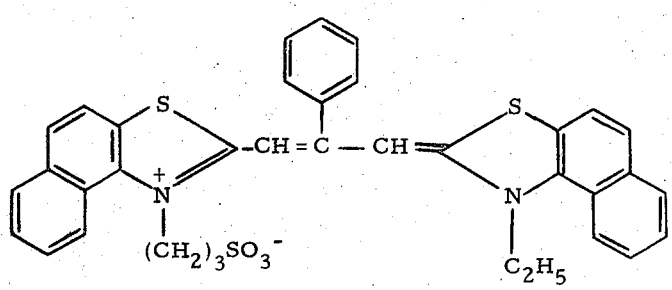
Dye 29.
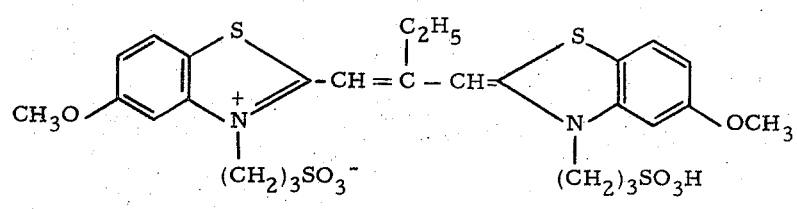
Dye 30.
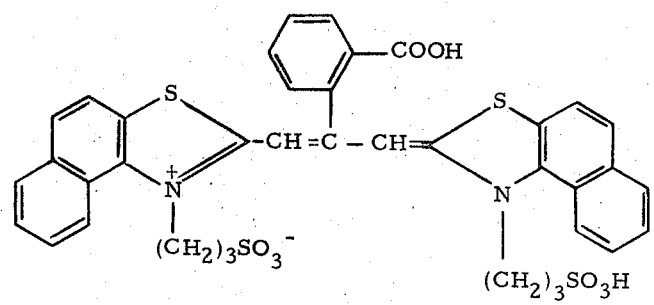
Dye 31.
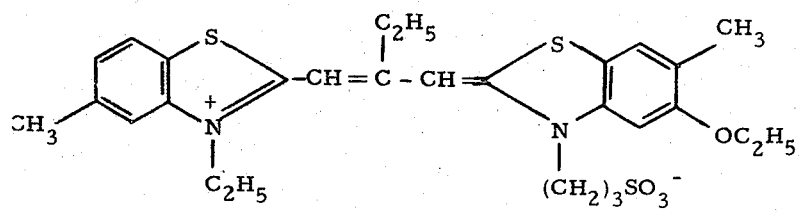

Dye 32.

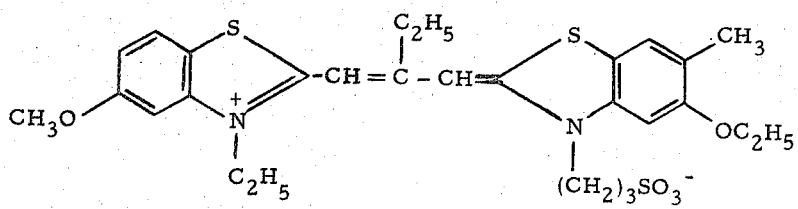

Dye 33.

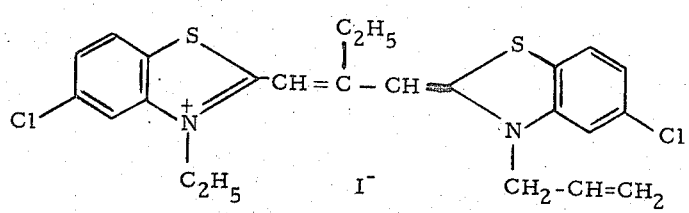

Dye 34.

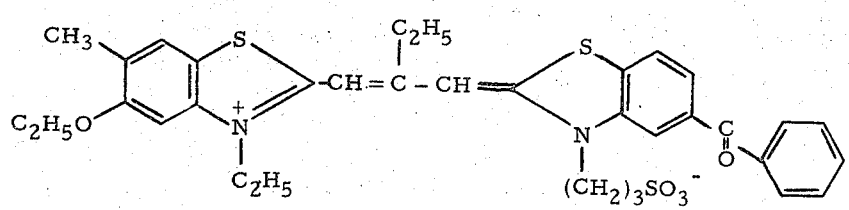

Dye 35.

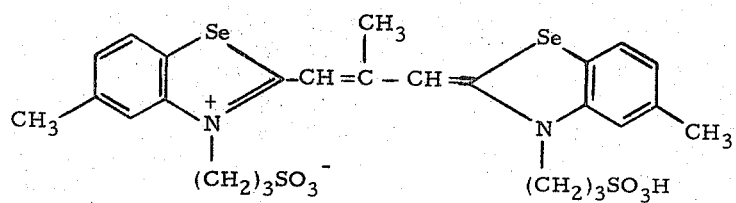

The sensitizing dyes used in the present invention can be prepared by one skilled in the art by referring to Frances M. Hamer, "The Cyanine Dyes and Related Compounds", John Wiley and Sons Ltd. (1964).

The spectral sensitizing method of the present invention is particularly effective for gelatin-silver halide emulsions, but is also effective on a silver halide emulsion containing any hydrophilic colloid other than gelatin or gelatin derivatives, such as, for example, agar-agar collodion, arabic gum, water-soluble natural or synthetic cellulose, derivatives thereof, polyvinyl alcohol, polyamides and other synthetic or natural hydrophilic resins.

The silver halide emulsion used in the present invention may be silver chloride emulsions, silver chlorobromide emulsions, silver iodobromide emulsions, silver bromide emulsions, or silver iodobromochloride emulsions, but particularly excellent results are obtained with silver chloride emulsions or silver iodobromide emulsions.

In order to prepare the silver halide photographic emulsions spectrally sensitized according to the present invention, one or more of the sensitizing dyes can be added by any known method to the silver halide emulsion which has preferably previously been chemically sensitized with one or more sulfur compounds, noble metal compounds or reductive compounds in a manner known to the art.

In practice, it is convenient to add the sensitizing dyes of the present invention in the form of a solution such as methanol solution or ethanol solution to the emulsion. The amount of the sensitizing dye or dyes in accordance with the present invention contained in the emulsion can vary within the range of from about 5 to 500 mg per 1 kg of the silver halide emulsion in accordance with the desired effect for a photographic sensitive material. The silver halide photographic emulsion can further be provided with hypersensitization and supersensitization materials as are known to the art.

In the production of silver halide photographic emulsions, additives commonly used in the art, such as, for example, other chemical sensitizers, stabilizers, antifogging agents, toning agents, hardening agents, surface active agents, plasticizers, antistatic agents, lubricants, development accelerators, color couplers, fluorescent brightening agents and the like, can be added to the emulsion in conventional amounts for their known purposes.

Figure 2:
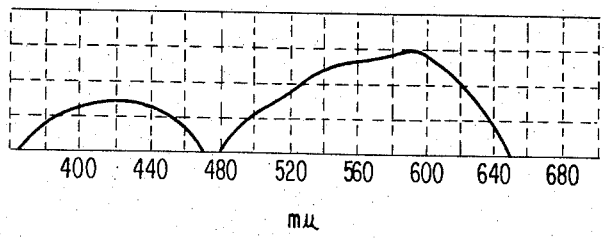
Figure 3:
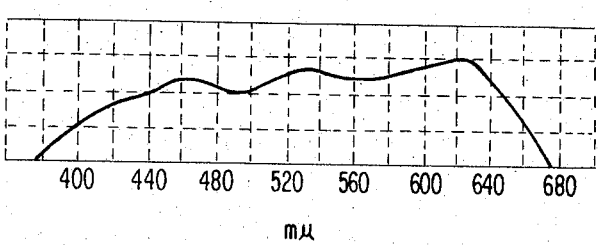

FIGS. 1–3 in the drawings portray spectral sensitization spectrum. The ordinates represent the sensitivity and the abscissae represent the wavelength (m$\mu$). FIG. 1 shows the spectral sensitization spectrum when sensitizing dye 1 described before it is added to a fine-grain silver halide photographic emulsion as is used in the present invention. FIG. 2 shows the spectral sensitization spectrum when a comparison sensitizing dye A (described below) is added to a fine-grain silver halide photographic emulsion as is used in the present invention. FIG. 3 shows the spectral sensitization spectrum when comparison sensitizing dye A is added to a relatively large particled silver halide photographic emulsion as is used for general photographic sensitive materials.

As will be understood from FIG. 2, the addition of comparison sensitizing dye A to a fine-grain silver halide photographic emulsion as is used in the present invention causes disappearance of the sensitization maximum at the long wavelength side of the red sensitive region (J-band sensitization), and extremely decreases the red sensitivity.

EXAMPLE 1

A silver iodochloride emulsion (AgI:AgBr=1 mole : 99 moles) with an average silver halide particle diameter of 0.06 micron, was divided into individual samples and to each sample there was added the sensitizing dye (shown in Table 2) to prepare the silver halide photographic emulsion. The emulsion was applied to a cellulose triacetate film base, and dried.

In order to determine the sensitivity of the emulsions using a coherent neon-helium light (wavelength: 632.8 m$\mu$), generally the laser beam generated from the laser tube is irradiated onto a rotary light diffusion disk, and after exposing the sensitive material with the transmitted laser light and developing, its photographic density (D) is measured with a densitometer. From the log (exposure)-D curve, the sensitivity can be determined. However, this method is not suitable for determining the sensitivities of many samples since exposures must be conducted one by one.

Accordingly, in the present examples, the samples were exposed to 8,000 lux tungsten light (2,854 °K) through an interference filter (Tmax 633 m$\mu\Delta\lambda$ ½ 2.5 m$\mu$, which transmits red light of a 633 m$\mu$ wavelength, and then developed. The developer having the composition given in Table 1 was used.

While the wavelength of a neon-helium light is almost identical to the filtered tungsten light, one might think that the coherent laser light differs theoretically from the tungsten light in sensitivity. However, the relative degree of sensitivity for each procedure can be treated as identical since the experimental exposure time is identical up to 3 figures. For example, this may be understood from the fact that the tungsten light requires 13.5 seconds exposure time, whereas the neon-helium laser light requires 13.3 seconds exposure time in order to obtain the same density when microfilm is exposed maintaining both light intensities identical by means of a thermopile (it is to be noted that 13.5 seconds time is substantially identical to 13.3 seconds time since the difference of only 0.2 seconds is within the experimental derivation).

Table 1

| | |
|---|---|
| Metol | 2 g |
| Hydroquinone | 88 g |
| Anhydrous sodium sulfite | 96 g |
| Anhydrous sodium carbonate | 48 g |
| Potassium bromide | 5 g |
| water to make 1 liter | |

Table 2 shows the red sensitivity and the maximum sensitization when the sensitizing dyes of the present invention are added.

In Table 3, representative dyes of the present invention are compared with several comparison dyes.

Table 2

| Dye | Amount to be added 29 g silver | Emulsion | Average particle diameter | Red sensitivity | Sensitization maximum |
|---|---|---|---|---|---|
| 1 | 1.6×10⁻⁴ mole gram | AgBrI | 0.06 $\mu$ | 1700 | 632m$\mu$ |
| 2 | do. | do. | do. | 750 | 638 |
| 3 | do. | do. | do. | 790 | 630 |
| 4 | do. | do. | do. | 850 | 630-635 |
| 5 | do. | do. | do. | 730 | 630 |
| 6 | do. | do. | do. | 820 | 625-630 |
| 7 | do. | do. | do. | 510 | 640 |
| 8 | do. | do. | do. | 1070 | 630-635 |
| 9 | do. | do. | do. | 880 | 648 |
| 10 | do. | do. | do. | 700 | 625 |
| 11 | do. | do. | do. | 1030 | 645 |
| 12 | do. | do. | do. | 2150 | 640 |
| 13 | do. | do. | do. | 730 | 625 |
| 14 | do. | do. | do. | 730 | 625 |
| 15 | do. | do. | do. | 760 | 630 |
| 16 | do. | do. | do. | 760 | 630 |
| 17 | do. | do. | do. | 990 | 648 |
| 18 | do. | do. | do. | 950 | 648 |
| 19 | do. | do. | do. | 1350 | 640 |
| 20 | do. | do. | do. | 760 | 635 |
| 21 | do. | do. | do. | 780 | 645 |
| 22 | do. | do. | do. | 1160 | 645 |
| 23 | do. | do. | do. | 1070 | 645 |
| 24 | do. | do. | do. | 1070 | 642 |
| 25 | do. | do. | do. | 1030 | 645 |
| 26 | do. | do. | do. | 850 | 650 |
| 27 | do. | do. | do. | 850 | 650 |
| 28 | do. | do. | do. | 1000 | 630 |
| 29 | do. | do. | do. | 820 | 640 |
| 30 | do. | do. | do. | 850 | 660 |
| 31 | do. | do. | do. | 730* | 645 |
| 32 | do. | do. | do. | 1120 | 645 |
| 33 | do. | do. | do. | 900 | 650 |
| 34 | do. | do. | do. | 750 | 625 |
| 35 | do. | do. | do. | 1720 | 640 |

*The red sensitivity values are shown as relative sensitivity, based on the red sensitivity of comparison dye A being 100, and using an interference filter (Tmax 633 m$\mu\Delta\lambda$1/2.5 m$\mu$).

Table 3

| Dye | Amount to be added 29 g silver | Emulsion | Average particle diameter | Red sensitivity | Sensitization maximum |
|---|---|---|---|---|---|
| 1  | 1.6×10⁻mole gram | AgBrI | 0.06μ | 1700 | 632mμ |
| 19 | do. | do. | do. | 1350 | 640 |
| 35 | do. | do. | do. | 1720 | 640 |
| A  | do. | do. | do. | 100  | 600 |
| B  | do. | do. | do. | 210  | 610 |
| C  | do. | do. | do. | 150  | 590 |

*The red sensitivity values are shown as relative sensitivity, based on the red sensitivity of comparison dye A being 100, and exposing through an interference filter (Tmax 633 mμ Δλ ½ 2.5 mμ).

The comparison dyes were used as shown below:

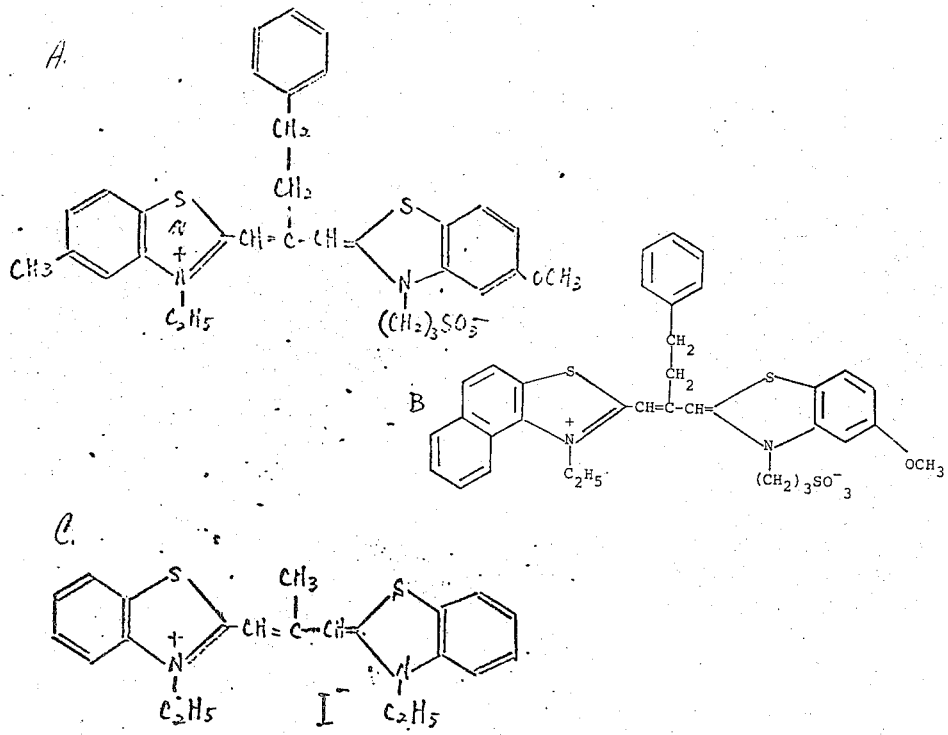

EXAMPLE 2

Sensitive materials containing sensitizing dyes 19, 35, comparison dye A and comparison dye B, respectively, were exposed using a neon-helium laser (single mode) having an output of 50 mW, and then developed using a developer of the composition described in Table 1. These materials were formed following the procedure of Example 1. The exposure time required to obtain the same density is given in Table 4.

Table 4

| Sensitizing dye | Exposure time * |
|---|---|
| 1  | 1.0 second |
| 19 | 1.3 |
| 35 | 1.0 |
| A  | 17.0 |
| B  | 8.5 |

*Exposure time required to obtain the same density.

As will be understood from Table 4, sensitizing dyes 1, 19 and 35 require less exposure time than comparison sensitizing dye A or B. That is, it can be understood that the former are more sensitive to neon-helium laser light than the latter. As a result of shortening the exposure time, the blurring of the image which takes place due to slight shocks on the apparatus can be reduced, and a clear hologram can be obtained.

While the invention has been particularly shown and described with reference to preferred embodiments thereof, it will be understood by those skilled in the art that various changes in form and details may be made therein without departing from the spirit and scope of the invention.

What is claimed is:

1. In a process of making photographic images by exposing a light-sensitive silver halide photographic emulsion to light from a neon-helium laser to produce a latent image, and developing said latent image to form a silver image, the improvement which comprises said silver halide photographic emulsion being a silver halide photographic emulsion containing silver halide particles having adsorbed thereon at least one sensitizing dye represented by the following general formula (I):

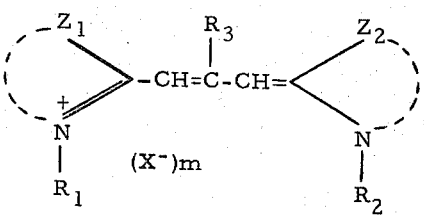

in which $Z_1$ and $Z_2$ each represent a benzothiazole nucleus, the benzene ring of said heterocyclic nucleus having at least one substituent selected from the group consisting of alkoxy, alkyl, phenyl, alkoxycarbonyl, hydroxy and halogen; $R_1$ (or $R_2$) represents an alkyl group and $R_2$ (or $R_1$) represents a sulfo alkyl group, respectively; $R_3$ represents a lower alkyl group or an aryl group; X represents an anion; m represents an integer of 0 or 1; and when the dye forms an intramolecular salt, m is 0; said dye being present in said silver halide photographic emulsion in an amount sufficient to effectively increase the sensitivity of said silver halide photographic emulsion to light from a neon-helium laser, wherein said silver halide particles have an average particle diameter of not more than 0.18 micron, or wherein at least 95 percent of the total silver halide particles have diameters of not more than 0.2 micron.

2. The process as claimed in claim 1 wherein the silver halide particles have an average grain size, by diameter, not greater than 0.1.

3. The process as claimed in claim 1 wherein the sensitizing dye is selected from the group consisting of

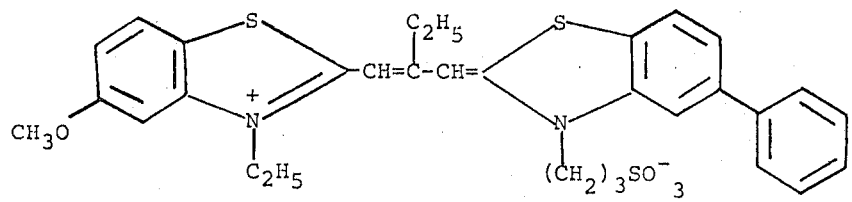

and

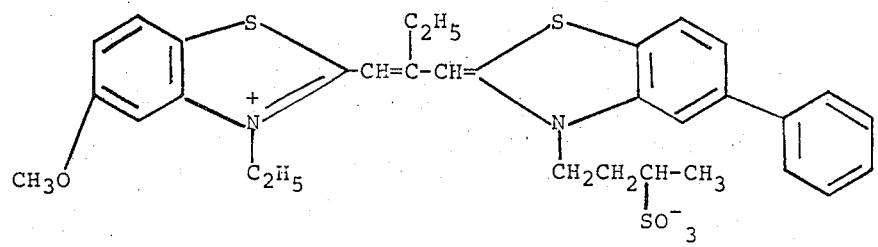

4. The process as claimed in claim 1 wherein the sensitizing dye is selected from the group consisting of

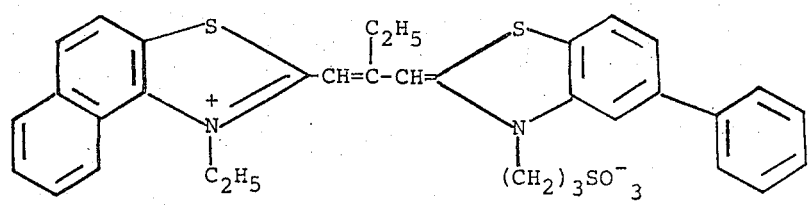

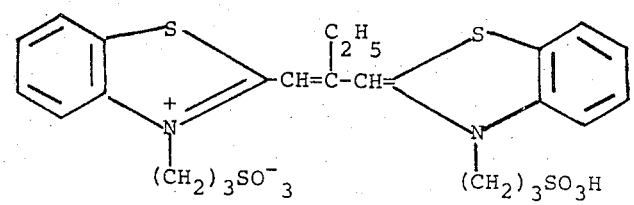

and

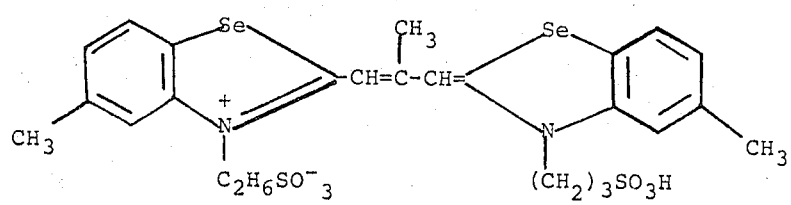

5. The process of claim 1, wherein the amount of said sensitizing dye in said silver halide photographic emulsion ranges from about 5 to 500 mg/1 kg of the silver halide in said silver halide photographic emulsion.

6. The process of claim 1, wherein said substituents on said benzene ring of said heterocyclic nuclei are alkyl, halogen, alkoxy, hydroxy, aryl, carboxy, alkoxycarbonyl, acylamino and combinations thereof.

* * * * *